United States Patent [19]

Wilson

[11] Patent Number: 5,014,733
[45] Date of Patent: May 14, 1991

[54] AUTOMATIC SWITCHING VALVE

[76] Inventor: Earl L. Wilson, 2163 Hayden Bridge Stub, Springfield, Oreg. 97477

[21] Appl. No.: 537,593

[22] Filed: Jun. 14, 1990

[51] Int. Cl.⁵ .............................................. G05D 7/01
[52] U.S. Cl. .................................................... 137/113
[58] Field of Search ............ 137/112, 113, 505, 505.18

[56] References Cited

U.S. PATENT DOCUMENTS

| | | | |
|---|---|---|---|
| 2,518,894 | 8/1950 | Humbarger | 137/113 |
| 3,658,081 | 4/1972 | Renaudie | 137/113 |
| 3,896,837 | 7/1975 | Rohling | 137/113 X |
| 3,968,814 | 7/1976 | Swanson | 137/505.18 |

Primary Examiner—Alan Cohan
Attorney, Agent, or Firm—James D. Givnan, Jr.

[57] ABSTRACT

A valve including spools each responsive to fluid pressure and each spring biased to an open position. Multiple sources of pressure, such as tanks, serve the valve. Tank pressure is directed in sequence through a spool in the open position to an end chamber of the remaining spool to shift the latter spool for uninterrupted passage of fluid pressure into an outlet of the end chamber and past a flow separator spool to a pressure regulator. Switching to a second tank occurs automatically upon a drop in end chamber pressure permitting shifting of a spool to an open position to direct fluid pressure to the end chamber of the remaining spool.

3 Claims, 1 Drawing Sheet

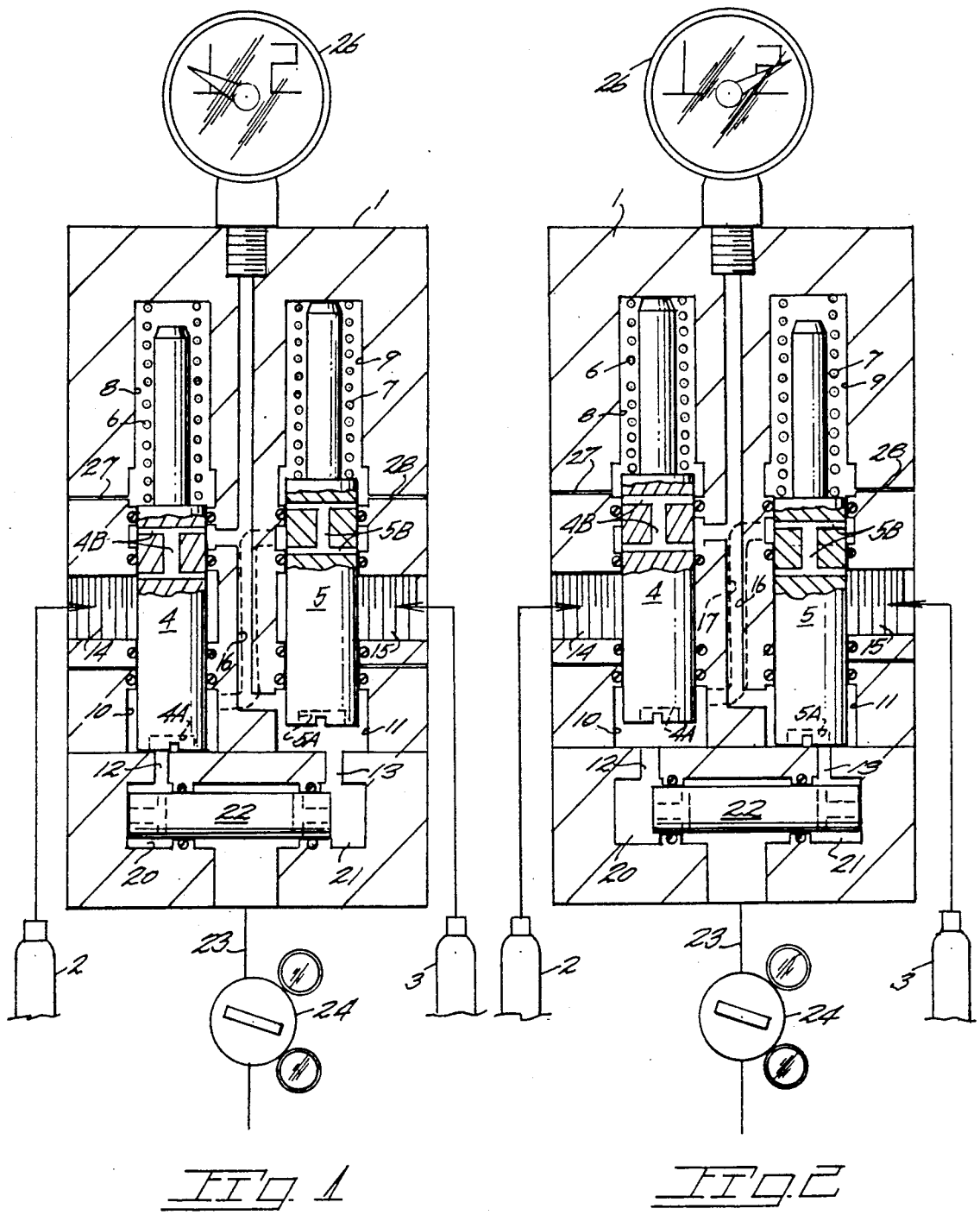

AUTOMATIC SWITCHING VALVE

BACKGROUND OF THE INVENTION

The present invention pertains generally to valves receiving two or more pressurized flows and which automatically select one flow for discharge.

In my earlier U.S. Pat. No. 4,889,152, the problem is discussed of providing adequate gas pressure from a tank source to a drink carbonator. The earlier patent discloses the use of a switching valve served by costly multiple pressure regulators each fed by a pressurized tank. Additionally, the earlier system included shutoff valves each associated with a tank source for automatic tank shutoff at a selected reduced pressure. Accordingly, several valves were required by the earlier system causing an adverse impact on system cost.

SUMMARY OF THE PRESENT INVENTION

The present invention is embodied in a switching valve in direct communication with multiple high pressure sources such as $CO^2$ cylinders of a carbonation system.

The present valve includes a pair of spring biased, pressure responsive spools each spring biased to an open position. The valve spools are configured to direct or transfer, when open, a pressurized gas flow from a source to the end located chamber of the other spool for shifting of the spool to a closed position. Upon gas pressure diminishing in the spool end chamber to a certain value, the spool therein is spring biased to an open position. In an open position, a spool transfers a flow from a new source to a second spool end chamber to displace that spool to a closed position. The single valve body may control gas pressure flows of several hundred PSI yet permits tank replacement without risk.

Important objectives include the provision of a single valve body wherein valve spools are capable of directing high pressure gas flows with automatic shifting of the spools to select a new source; the provision of a valve of simple construction providing a low cost of manufacture yet a valve having high reliability by reason of few components.

BRIEF DESCRIPTION OF THE DRAWINGS

In the accompanying drawings:

FIGS. 1 and 2 are sectional views of the present valve with the valve spools shifted to utilize different fluid pressure sources.

DETAILED DESCRIPTION OF THE PREFERRED EMBODIMENTS

With continuing attention to the drawings wherein applied reference numerals indicate parts similarly hereinafter identified, the reference numeral 1 indicates a valve body for incorporation into a pressure system having multiple pressure sources such as $CO^2$ tanks at 2 and 3 each equipped with standard outlet valves and controls (not shown).

First and second valve spools at 4 and 5 are each biased by first and second spool springs 6 and 7 in spring chambers 8 and 9. Spool end chambers are at 10 and 11 each having an outlet at 12 and 13. A spool end 4A and 5A permit at least a flow to the outlets.

Serving each spool is an inlet port at 14 and at 15 at tank pressure.

The spools 4 and 5 are each provided with lateral and axial bores 4B-5B to direct gas pressure from an inlet port 14-15 to a valve body passageway at 16 and at 17 respectively. The passageways at 16 and 17 serve to direct a pressurized gas flow to end chambers 10 or 11 receiving the other spool. Accordingly, each spool may, when open, direct a pressure flow to the end chamber of the other spool.

Outlets 12 and 13 deliver pressure flows in sequence to a separator valve chamber 20-21 to shift a separator spool 22 to isolate the outlets 12 and 13 from one another.

An outlet line at 23 is provided with a pressure regulator at 24 for controlling pressure to an outlet such as a soft drink carbonating device not shown.

In operation, with the spools positioned as in FIG. 1, a pressurized gas flow from cylinder 2 enters inlet port 14 and is directed by valve spool passages 4B to passageway 16 and hence to end chamber 11 of spool 5. Spool 5 is accordingly lifted from its seated position against the action of spring 7 to allow an unrestricted pressure flow out outlet 13, through repositioned separator valve spool 22 and utlimately to outlet line 23.

As cylinder 2 pressure diminishes, the pressure in end chamber 11 will fall below the value necessary to fully compress spring 7 and the latter will shift spool 5 downward toward a seated position. Fluid pressure from tank 3 in inlet port 15 will now be directed by the passages 5B in spool 5 and then to passageway 17 and to end chamber 10 of spool 4 to lift the latter from its seated position to a position whereat its passages 4B are closed. Separator spool 22 will be shifted to the right by tank pressure in chamber 20 to permit a pressure flow from outlet 12 to outlet line 23.

Upward movement of spools 4 and 5 to their positions closing passages 4B-5B is cushioned by the admission of residual tank pressure into the spring chambers 8 and 9 via the passages during upward spool travel. Pressure admitted to a spring chamber during downward spool travel assists the spring therein in moving the spool downward in a positive manner. Exhaust vents or bores at 27-28 serve to meter pressure from the spring chambers to avoid a pressure lock in the spring chambers.

A tank indicator at 26 includes a pointer biased by tank pressure from tank 2 to indicate which tank is in use. In the absence of tank pressure in passageway 16 (when passages 4B are closed), the indicator will reposition automatically to indicate the tank source has been changed. Tank changeover results from spool 4 or 5 moving downwardly when spring 6 or 7 overcomes the diminished pressure in end chamber 10 or 11.

The present valve may be used in series to increase the number of pressure sources and accordingly the two tanks shown are not intended to imply the present valve so limits the number of sources. Further, while a separator spool 22 is shown, it is to be understood that the outlets 12 and 13 may serve check valves having a common outlet line to the pressure regulator 24.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

I claim:

1. A valve for automatically communicating a fluid pressure source of multiple pressure sources to a common outlet line, said valve comprising, a valve body including first and second inlet ports each adapted for communication with a separate source of fluid pressure, first and second spool chambers in said valve body, each of said spool chambers including an end chamber, first and second spools respectively in said chambers and each fluid biased to a closed position, first and second springs respectively biasing said spools to an open position, passageways in said valve body receiving spool controlled fluid pressures and each terminating at an end chamber of said spool chambers, each of said spools configured to transfer when in an open position a pressure flow from one of said inlet ports to one of said passageways serving the end chamber of the spool chamber of the remaining spool, flow separator means in said valve body sequentially receiving pressure flows from said end chambers, said flow separator means including a spool responsive to said pressure flows from said end chambers, and said flow separator means in communication with the common outlet line.

2. The valve claimed in claim 1 wherein each of said spools define axial and lateral bores for delivering a pressure flow to said passageways.

3. The valve claimed in claim 1 additionally including a tank indicator in fluid communication with at least one of said passageways.

* * * * *